United States Patent [19]

Grossmann et al.

[11] Patent Number: 5,247,846
[45] Date of Patent: Sep. 28, 1993

[54] QUICK DISCONNECTABLE SCREW DEVICE

[75] Inventors: Klaus-Dieter Grossmann, Leun; Bruno Tews, deceased, late of Wetzlar; Holger S. Tews, heir, Schöffengrund-Laufdorf, all of Fed. Rep. of Germany

[73] Assignee: Wild Leitz GmbH, Wetzlar, Fed. Rep. of Germany

[21] Appl. No.: 477,955

[22] PCT Filed: Oct. 7, 1989

[86] PCT No.: PCT/DE89/00641
    § 371 Date: May 20, 1992
    § 102(e) Date: May 20, 1992

[87] PCT Pub. No.: WO90/04120
    PCT Pub. Date: Apr. 19, 1990

[30] Foreign Application Priority Data

Oct. 10, 1988 [DE] Fed. Rep. of Germany ....... 3834418

[51] Int. Cl.⁵ ............................................. F16H 25/20
[52] U.S. Cl. .......................... 74/99 R; 74/424.8 A; 74/424.8 R; 74/414; 74/424.5; 269/91; 269/92; 269/93; 269/221
[58] Field of Search .............. 74/99 R, 112, 127, 414, 74/424.8 R, 424.8 A, 424.5, 424.7; 269/91, 92, 93, 221

[56] References Cited

U.S. PATENT DOCUMENTS

| 2,398,941 | 4/1946 | Jordan | 74/424.8 A |
| 2,648,991 | 8/1953 | Henry | 74/424.8 R |
| 3,570,836 | 3/1971 | Pettavel | 269/92 |
| 3,623,718 | 11/1971 | Thomeczek, Sr. | 269/184 X |
| 3,965,761 | 6/1976 | Stanley | 74/89.15 |
| 4,375,770 | 3/1983 | Druet | 74/424.8 R |

FOREIGN PATENT DOCUMENTS

| 0025750 | 3/1981 | European Pat. Off. |
| 151263 | 8/1985 | European Pat. Off. |
| 2311485 | 9/1974 | Fed. Rep. of Germany |
| 2316567 | 10/1974 | Fed. Rep. of Germany |
| 2414532 | 10/1975 | Fed. Rep. of Germany |
| 2502052 | 10/1975 | Fed. Rep. of Germany |
| 3026158 | 2/1982 | Fed. Rep. of Germany |
| 8302747.5 | 7/1983 | Fed. Rep. of Germany |
| 379885 | 8/1964 | Switzerland | 269/93 |
| 495193 | 10/1970 | Switzerland |
| 658620 | 11/1986 | Switzerland |
| 1369594 | 10/1974 | United Kingdom |
| 1602431 | 11/1981 | United Kingdom |

OTHER PUBLICATIONS

S. Hildebrandt, Precision Components, Berlin 1968, pp. 258–259.
R. v.Voss, Precision Components, 2nd Edition, Berlin 1938, pp. 160–161.
K. Schreyer, *Werkstuckspanner*, 1959, p. 106.

Primary Examiner—Allan D. Herrmann
Assistant Examiner—William O. Trousdell
Attorney, Agent, or Firm—Foley & Lardner

[57] ABSTRACT

A quick-disconnectable device with a screw piece, a first threaded part and a second threaded part, the threaded of which fits with the first threaded part, wherein the screw piece has a straight guide for the first threaded part, and the screw piece has a radial bearing and an axial bearing for the second threaded part, the longitudinal direction of the straight guide and the axis of rotation of the radial bearing are arranged parallel to one another, the two threaded parts are guided at a distance at which the mutual engagement of the two threaded parts is possible, the second threaded part has an external thread, and is equipped with a recess which completely interrupts the engagement of the threads at least in a specific rotary position An embodiment as a compact light and simple quick-acting clamping means for variable clamping geometry for articles to be measured on automatic 3D-measuring machines or as a spindle drive with high-speed disengagement.

7 Claims, 2 Drawing Sheets

QUICK DISCONNECTABLE SCREW DEVICE

BACKGROUND OF THE INVENTION

The invention relates to a quick disconnectable screw device. The present invention relates more particularly to a screw device with a screw piece, a first threaded part and a second threaded part, the thread of which fits with the first threaded part, wherein the screw piece has a straight guide for the first threaded part, an axial and radial bearing for the second threaded part, and the pushing direction of the straight guide and the axis of rotation of the radial bearing being arranged parallel to one another.

Screw devices of this type are generally known also as screw gears and allow a uniform conversion of movement between rotation and longitudinal. The screw joint is thus normally formed from a screw and a nut with an external and an internal thread. The distance and speed of displacement of the nut relative to the screw are selectable within wide limits by means of the screw length and the pitch of the thread as well as the rotational speed between the screw and nut. Screw gears are used, for example as setting gears in optical instruments, as a spindle displacement for tools or workpieces on machine tools and as an adjusting device or clamping device. At the same time, there is often a need to cover large displacement distances quickly, but then to make a very fine setting within a narrow range or then to exert high forces in the direction of displacement. However, since, in a screw gear, only the rotational speed is variable during operation, compromises are necessary. The situation is different if there is a possibility of cancelling the engagement of the two threads.

From S. Hildebrand, Feinmechanische Bauelemente [Precision Components], Berlin 1968, page 258 ff., a slip-on nut is known which, in addition to the threaded bore, also has a passage bore arranged obliquely relative to this. In the oblique position, the slip-on nut can be displaced freely on a screw, and after tilting in the axial direction the nut thread engages into the screw thread and normal screwing is possible with an unlimited travel. The necessary additional tilting movement is a disadvantage, at least where modifications, for example as a clamping means, are concerned.

Bayonet fastenings with a safeguard by means of a screw connection are known from Richter, v. Voss, Bauelemente der Feinmechanik [Precision Components], 2nd edition, Berlin 1938, page 160 ff. Here, two parts to be connected have an external and an internal thread which, on both parts, is milled away at three locations on the circumference, so that the parts can be plugged together and connected as a result of a rotation of approximately 60°. Quick-acting clamping screws working on this principle are also known. In these, the part with the external thread (screw) also necessarily has to be machined especially. Only an angle of rotation of 60° is available for the screwing movement, and therefore the longitudinal travel is restricted to only one sixth of the pitch of the thread. The two parts have to be in a specific angular position relative to one another in order to be joined together.

German Offenlegungsschrift 2,311,485 makes known a measuring device of snap gages, in which the objects to be measured are clamped in a special clamping block by means of a simple screw bolt. When the objects to be measured are changed, either the entire clamping block has to be exchanged, or if only the clamping width is different the screw bolt has to be rotated laboriously up to the appropriate clamping width. The result is a high outlay for the stock-keeping of the clamping blocks and long conversion times.

SUMMARY OF THE INVENTION

It is an object of the invention to provide a quick disconnectable screw device, in which a high-speed disengagement is possible by means of only a rotational movement and which allows an unlimited travel in the engaged state. Such a screw device as a quick-acting clamping claw is to be especially suitable as a universal and rapid clamping means for the fastening of objects to be measured on modern automatic 3D-measuring machines.

This object is achieved by quick-disconnectable screw device, comprising:

a screw piece including a straight guide, a radial bearing and an axial bearing, and wherein the longitudinal direction of the straight guide and the axis of rotation of the radial bearing being arranged parallel to one another;

a first threaded part including a thread guided in said straight guide of said screw piece; and a second threaded part including;

an external thread which fits with said thread of said first threaded part, said second threaded part being guided in said radial bearing and said axial bearing at a distance to said first threaded part at which a mutual engagement of the threads of the first and second threaded part is possible, and a recess which completely interrupts the engagement of the threads of said first and second threaded parts at least in a specific rotary position.

The invention starts from the finding that a screw joint can be produced even without the normally adopted sheathing of the screw by the nut. Rather, it is sufficient for the two threads to engage in one another only over a sector. Both threads can then be external threads. Only the low load-bearing capacity of the screw joint has to be borne in mind.

Screw devices according to the invention are used especially advantageously as a quick-acting clamping claw, especially for the fastening of objects to be measured on modern automatic 3D-measuring machines. Such 3D-measuring machines execute fully automatic dimensional measurements at high speed and, for the most efficient possible machine utilization, are fed by automatic handling systems with objects to be measured which are fastened on pallets. There are therefore special requirements demanded of the clamping means for fastening the object to be measured on the pallets. To ensure that the pallets can be occupied in a closely packed manner and to prevent collisions with the measuring head or detours to be made by this, the clamping means should be compact. A low weight is desirable in order to limit the loads to be moved by the handling appliances. A flexible clamping geometry is important because, in contrast to production machines, series of identical parts virtually never have to be clamped, but instead changing individual items, for example gages, with different dimensions.

The main requirement is a short set-up time for the occupancy of the pallets, which is related to the measurement time, so that the outlay in terms of personnel and the outlay for pallets to be provided, etc. remain restricted. In addition, the clamping means will be as universally useable as possible, in order to make any intervention quick and reliable by means of a small number of different elements, and for this they will be adjustable rapidly and will be clampable quickly. Simple and costeffective production is required because of the large number of clamping means to be kept in stock.

All these requirements can be satisfied in an outstanding way by screw devices according to the invention designed as quick-acting clamping claws. Further objects, features and advantages of the present invention will become apparent from the detailed description of preferred embodiments which follows, when considered together with the attached drawings.

DETAILED DESCRIPTION OF THE PREFERRED EMBODIMENTS

Figure 1A:
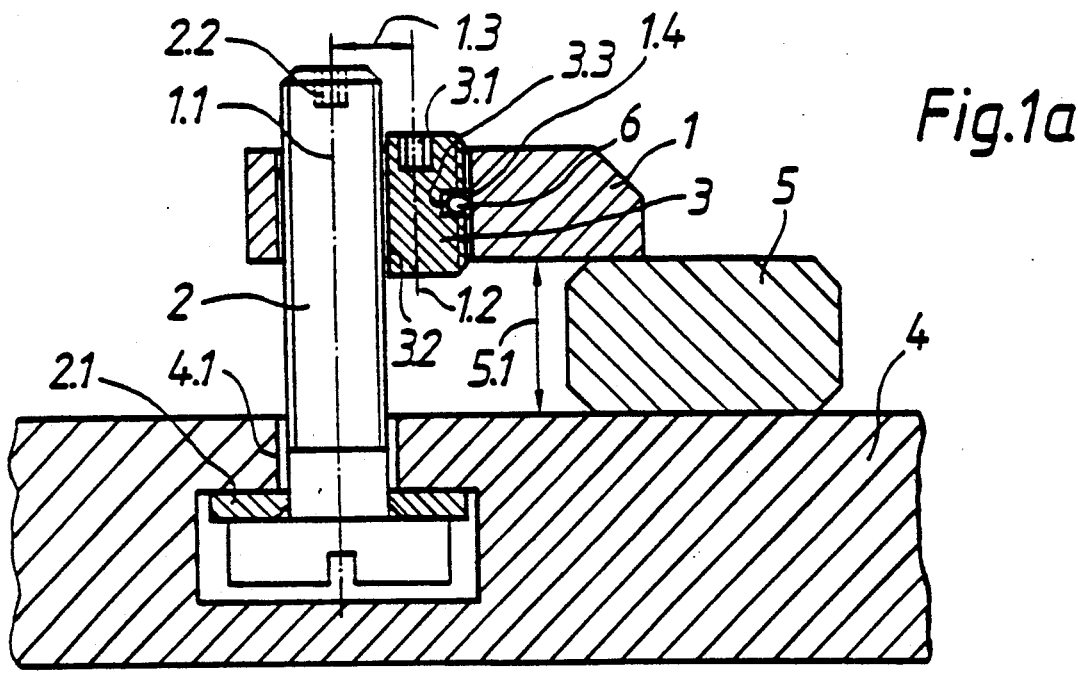
FIG. 1a shows a lateral section of a screw device according to the invention as a quick-acting clamping claw with an especially simple clamping piece
Figure 1B:
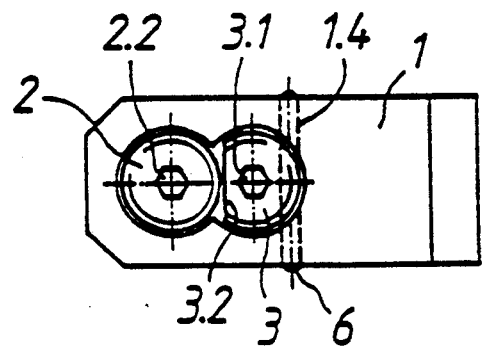
FIG. 1b shows a top view of the device of FIG. 1a FIG. 2a shows a lateral section of a clamping piece according to the invention

FIG. 1a and 1b show an example of an embodiment of a screw device according to the invention as a quick-acting clamping claw for the fastening of workpieces on a machine table.

A clamping jaw is formed as a screw piece 1, a screw 2 is provided as a first threaded part and a setscrew 3 is provided as a second threaded part. The screw 2 is fastened to a machine table 4, on which rests a workpiece 5 which is held by the clamping jaw 1. The screw 2 can be a standard screw which with its head, if appropriate with a shim 2.1, engages into a T-groove 4.1 of the machine table 4. A tool engagement, for example a hexagon socket 2.2, on the upper screw end is expedient. For this purpose, the set screw 3 (see FIG. 1b) is flattened on one side to the core diameter, so that a recess 3.2 is obtained, and an annular groove 3.3 is made by lathe-turning. The setscrew 3 has the same thread as the screw 2 and can be produced from a short standard setscrew with a hexagon socket 3.1.

The clamping jaw 1 in its simplest form is a metal cuboid having two parallel passage holes 1.1, 1.2 for the screw 2 and the setscrew 3 which are made at the distance 1.3 of the sum of the flank radii of the threads of the screw 2 and setscrew 3, with the result that no web remains between them. The first passage hole 1.1 is the straight guide for the screw 2, whilst the second passage hole 1.2 is the radial bearing for the setscrew 3. To provide the necessary axial bearing, made in the clamping jaw 1 transversely relative to the second passage hole 1.2 is a bore 1.4, into which is inserted a pin 6 engaging into the annular groove 3.3 of the set-screw 3.

When the setscrew 3 has been inserted into the second passage bore 1.2 of the clamping jaw 1 and secured axially by means of the pin 6, it is rotated so that the recess 3.2 points towards the first passage hole 1.1. The clamping jaw 1 can now be placed by means of the first passage hole 1.1 on to the screw 2, displaced over the entire length of the screw 2 and rotated freely relative to this. The clamping jaw 1 can therefore be brought to bear on the workpiece 5 in any angular position relative to the screw 2 and with any clamping width 5.1. Now if a rotary tool is inserted into the hexagon socket 3.1 and the setscrew 3 rotated through a small angle, the thread present outside the recess 3.2 then engages with the thread of the screw 2. The function of a locking mechanism is thus first performed, that is to say the setscrew 3 as a detent engages positively into the screw 2 as a locking member and thus blocks the longitudinal displacement between the screw 2, the setscrew 3 and the clamping jaw 1.

During a further rotation of the setscrew 3, the arrangement as a screw gear then takes effect, because the mutual engagement of the threads provides a screw joint between the setscrew 3 and screw 2. A rotation of the setscrew 3 in the clamping piece 1 then causes a displacement of the clamping piece 1 relative to the screw 2 and therefore relative to the machine table 4 and the workpiece 5. The workpiece 5 can thus be clamped.

Engagement of the locking mechanism is possible over the entire range of adjustment of the clamping width 5.1, but only at catch intervals of a lead of the threads of both the screw 2 and the setscrew 3. The wedge shape of all the faces of the threads and the flat transition from the recess 3.2 to the thread of the setscrew 3 ensure that the locking during the rotation of the setscrew 3 is of easy action. In contrast, trapezoidal threads, otherwise preferred for movement screws, are less suitable because jamming between the outer circumferential faces is highly probable.

An arcuate form of the recess 3.2 of the setscrew 3 in which a larger threaded sector remains is also more likely to lead to jamming during the locking.

After the locking, the travel which the screw gear can execute is determined by the pitch of the thread of the setscrew 3 multiplied by the number of revolutions of the setscrew 3. Since, during each revolution of the setscrew 3, the released position in which the recess 3.2 is located opposite the screw 2 is reached, only an approximately ⅞ revolution can be used for the screw gear. The travel obtainable for the clamping movement between the clamping piece 1 and screw 2 as a result of the rotation of the setscrew 3 therefore amounts to only approximately ⅞ of the pitch of the setscrew 3. For single-flight threads, the pitch is equal to the lead. The maximum travel of the clamping movement is therefore initially smaller than the catch interval of the locking. If, as described, the screw 2 is fastened rotatably to the machine table 4, then, as a result of its rotation on the hexagon socket 2.2, a clamping movement with any travel can be added to the clamping movement as a result of the rotation of the setscrew 3, as with a conventional screw/nut pairing. Thus, the position of the catch settings of the locking mechanism is also adjustable as desired. However, the operation of two actuating elements is then often necessary for clamping.

If the screw 2 and setscrew 3 are equipped with multiple threads, the clamping can always be obtained simply by rotating the setscrew 3. With double-flight thread, the pitch is twice as large as the lead, so that, for ⅞ revolutions, the travel is 1½ times the lead and therefore the catch interval.

Figure 2A:
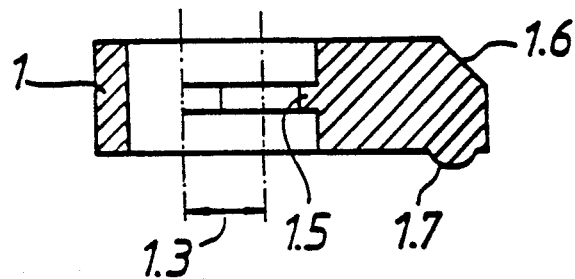
FIG. 2b shows a top view of the clamping piece of FIG. 2a FIG. 3 shows an alternative embodiment with a triangular column as a carrier of the first threaded part which is also formed as a sector of an internal thread
Figure 2B:
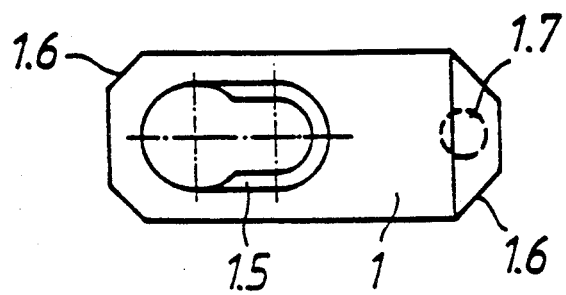

FIGS. 2a and 2b show another embodiment of the clamping piece 1 which is especially suitable for production as a light-metal casting. The two passage holes 1.1 and 1.2 of the version according to FIG. 1a are combined to form a long hole into which a web 1.5 projects. The web 1.5 leaves the region of the first passage hole 1.1 for the screw 2 completely free and is so formed that it engages into the groove 3.3 of the setscrew 3 and thus forms the axial bearing of the latter. For assembly, the setscrew 3 is inserted in the region of the first passage hole 1.1, introduced with its groove 3.3 into the web 1.5 and pushed laterally into its basic position. A simpler assembly is thereby possible, because there is no need to insert the pin 6, and moreover the axial bearing in the groove 3.3 has a significantly larger bearing surface and therefore a higher load-bearing capacity. Especially in the version as a casting, material and weight can also be saved advantageously by mean of flattened portions 1.6 and the like in the non-loaded regions of the basic cuboid form of the clamping piece 1 according to FIG. 1a.

It is also easily possible to provide a special thrust piece 1.7 for contact with the workpiece to be clamped, for example a knife edge or a spherical cup. The use of a separate constructional part as a thrust piece 1.7 involves a higher outlay. Advantageous for this is an embodiment made of hard or hardened material or an embodiment with a pressure plate guided in a ball joint and allowing the best possible surface pressure of the workpiece 5.

In comparison with a conventional pairing of a screw and nut, the screw joint presented here has a lower load-bearing capacity, since the surface load is replaced by the load of the small sector, in the critical instance only the line of contact, on a circular ring. The load-bearing capacity of the quick-acting clamping claw according to FIGS. 1a and 2 is increased by tilting the clamping piece 1 relative to the screw 2 under load, so that, with a suitable fit of the passage hole 1.1, a clamping by canting is obtained and can receive an additional load.

A positive restriction of the clamping force of the clamping claw presented is advantageous. With a given distance between the screw 2 and thrust piece 1.7, a given rigidity of the clamping piece 1 and of the screw 2 and a given pitch of the thread of the setscrew 3, the clamping force between the thrust piece 1.7 on the clamping piece 1 and the machine table 4 is limited over the screw-gear travel limited by the restricted angle of rotation of the setscrew 3 during engagement with the screw 2. It is thus possible to do without the use of torque wrenches or the like for operating the clamping claw. To adjust the limit force, with the other constructional data remaining fixed, the recess 3.2 of the thread on the setscrew 3 can be varied, thereby limiting the possible angle of rotation during the engagement of the threads and consequently also the travel of the screw gear.

The screw 2 can be fastened to the machine table 4 in all the usual ways. However, if it is screwed directly into a thread of the machine table 4, it is no longer possible to adjust the clamping claw by rotating the screw 2 in addition to operation by means of the setscrew 3.

Since only a narrow sector of the thread of the screw 2 is in engagement with the setscrew 3, the screw 2 can also be replaced directly by a prism-shaped column with a threaded sector, for example in order to save weight.

Figure 3:
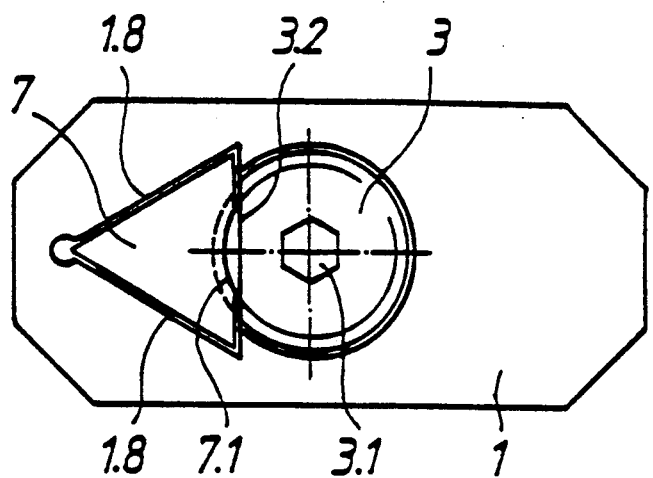

FIG. 3 shows the embodiment of a quick-acting clamping claw with a triangular column 7 instead of a screw 2, with appropriate guides 1.8 in the clamping jaw 1. The threaded sector 7.1 is shown as a sector of an internal thread. The result of this is that the threaded sector 7.1 and the setscrew 3 can be in engagement over the entire width of the threaded sector 7.1, so that this version of the screw gear gives the quick-acting clamping claw an especially high load-bearing capacity.

The embodiment described are therefore especially suitable for satisfying the requirements demanded of clamping means for the fastening of objects to be measured on modern automatic 3D-measuring machines. Since there are no space-obstructing levers, the clamping claws are compact and, particularly with a light-metal clamping piece 1, are also light. The clamping width can be adjusted especially easily. By keeping in stock screws 2 of differing length which can be cheap standard parts, the vertical space requirement of the clamping claws can be matched, as required, to the necessary clamping width. Just a few different dimensions of the clamping claws can be provided for different clamping forces or extension widths. It is possible to carry out the adjustment of the clamping width, the locking and the clamping by one hand with a tool simply by operating the setscrew 3—pushing and rotating. The angular position of the clamping piece 1 relative to the screw 2 is as desired and need not be adjusted. Very short set-up times for clamping different objects to be measured can therefore be achieved. The clamping claw consists of only three individual parts, and the screw 2 can be directly a standard part and also the set screw 3 and the clamping part 1 are simple workpieces.

Figure 4:
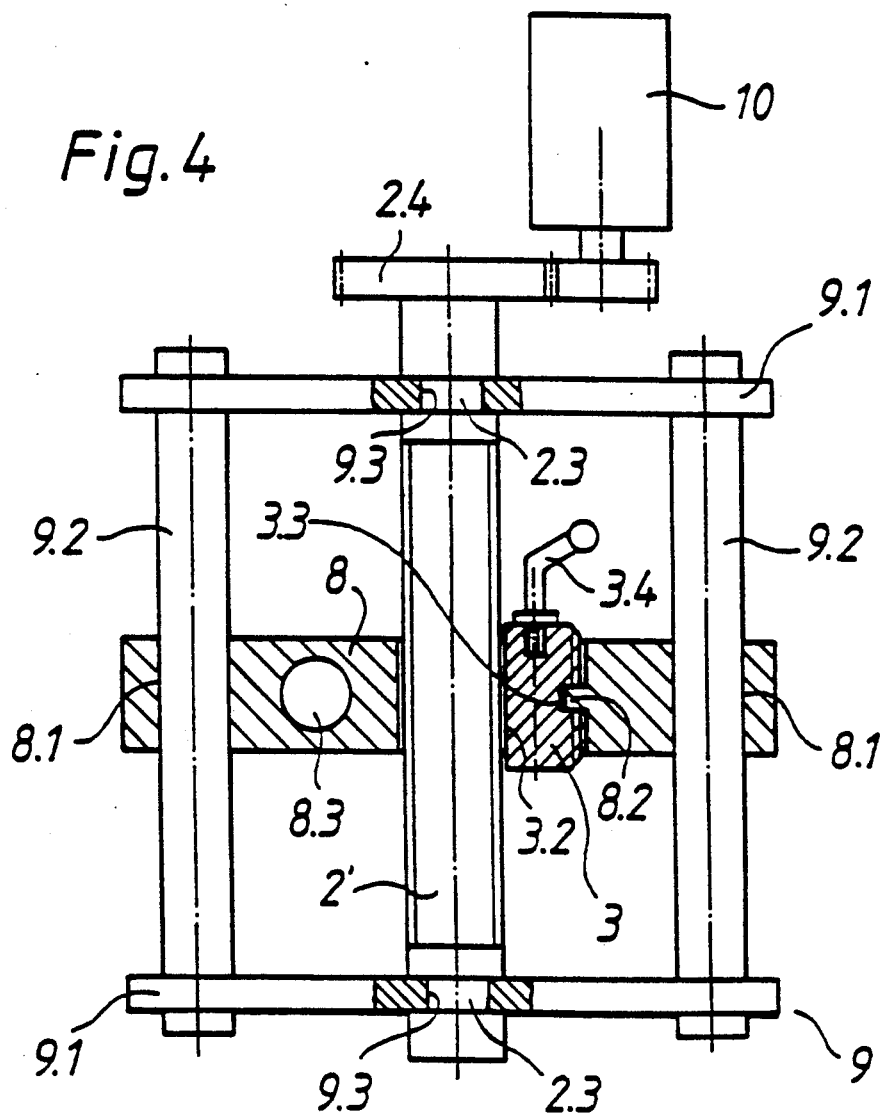
FIG. 4 shows a screw device according to the invention formed as a spindle drive for a linear displacement device.

An example of a screw device according to the invention in a completely different sector of use is shown in FIG. 4 which illustrates a spindle drive for a linear displacement device, such as is suitable, for example, in machine tools for the tool or workpiece adjustment or can be used in optical instruments for the adjustment of optical elements. There are often simultaneously the requirements of a rapid adjustment over a long travel and of an exact positioning within a small range. Also, a rapid stopping of the displacement movement is frequently necessary for safety reasons. A spindle drive with a device according to the invention with high-speed disengagement meets these requirements in a special way. FIG. 4 shows a screw spindle 2' which drives a sliding body 8 in a guide frame 9. The guide frame 9 can be designed in any form, for example, as shown, as a framework with end pieces 9.1 and two round bars 9.2 fastened in parallel therein as guide tracks by which the sliding body 8 is guided. The end pieces 9.1 carry centrally between the round bars 9.2 radial and axial bearings 9.3 for the bearing points 2.3 of the screw spindle 2' which carries a gearwheel 2.4 at one end and which is driven by means of a motor 10 with a pinion. In known arrangements, the sliding body 8 then carries a nut thread which surrounds the thread of the screw spindle 2'. According to the invention, however, the sliding body 8, like the clamping claw 1 in FIG. 1a, has a passage bore for the screw spindle 2' and, parallel to this, a bore for the setscrew 3 also shown in FIGS. 1a and 1b, with the recess 3.2 of the thread on one side and a groove 3.3 for axial mounting. Deviating from the embodiment of FIGS. 1a and 1b the setscrew 3 is shown equipped with an adjusting lever 3.4 which allows it to be rotated without a tool. A pin or a web 8.2 of the sliding body 8 engages into the groove 3.3 of the setscrew 3. A toolholder 8.3 formed on the sliding piece 8 is shown diagrammatically.

When the recess 3.2 of the setscrew 3 faces the screw spindle 2', the sliding body 8 is freely displaceable relative to the screw spindle 2', and, for example, can be manually displaced rapidly, for example in order to bring a tool fastened to the sliding body 8 from a waiting position up to a workpiece. The setscrew 3 is then rotated so that the two threads come into engagement, as already described in relation to FIGS. 1 to 3. The sliding body can now be displaced longitudinally in the disclosed way on the guide frame 9 by rotating the screw spindle 2' by means of the motor 10. For example, in the event of danger, the lever 3.4 is changed over, even with the motor 10 running, so that the recess 3.2 of the setscrew 3 faces the screw spindle 2', with the result that the drive of the sliding body 8 is interrupted immediately.

The illustrated exemplary embodiments of quick disconnecting screw device according to the invention are not conclusive. The most diverse embodiments and applications of the principle are possible.

We claim:

1. A quick-disconnectable screw device, for example for a screw thread or a clamping device, comprising:
   a screw piece including a straight guide for a first threaded part, a radial bearing and an axial bearing for a second threaded part, wherein the longitudinal direction of the straight guide and the axis of rotation of the radial bearing being arranged parallel to one another;
   said first threaded part including a thread guided in said straight guide of said screw piece;
   said second threaded part including
   an external thread which fits with said thread of said first threaded part, said second threaded part being guided in said radial bearing and said axial bearing at a distance to said first threaded part at which a mutual engagement of the threads of the first and second threaded part is possible, and
   a recess which completely interrupts the engagement of the threads of said first and second threaded parts at least in a specific rotary position.

2. A screw device according to claim 1, wherein the first threaded part includes an external thread.

3. A screw device according to claim 1, wherein the first threaded part includes a sector of a thread.

4. A screw device according to claim 1, wherein the two threaded parts include multiple threads.

5. A screw device according to claim 1, wherein the screw device being formed as clamping means with a high-speed device being formed as clamping means with a high-speed adjustment of the clamping width, the screw piece being formed as a clamping part.

6. A screw device according to claim 1, wherein the screw device being formed as a spindle drive for a linear displacement device, the piece being formed as a sliding body.

7. A quick-disconnectable screw device, comprising:
   a screw piece including a first and a second passage hole arranged generally parallel to each other;
   a first threaded part guided in said first passage hole; and
   a second threaded part guided by a radial bearing and an axial bearing in said second passage hole at a distance to said first threaded part at which a mutual engagement with said first threaded part is possible; and
   a recess formed in said second threaded part which interrupts said mutual engagement upon rotation of said second threaded part at a predetermined position.

* * * * *